United States Patent
Amir et al.

(10) Patent No.: US 9,341,700 B2
(45) Date of Patent: May 17, 2016

(54) SYSTEM AND METHOD FOR MULTIMODE WI-FI BASED RTLS

(71) Applicant: Centrak, Inc., Newtown, PA (US)

(72) Inventors: Israel Amir, Newtown, PA (US); Karuppiah Annamalai, Yardley, PA (US); Ari Naim, Tenafly, NJ (US)

(73) Assignee: CENTRAK, INC., Newtown, PA (US)

(*) Notice: Subject to any disclaimer, the term of this patent is extended or adjusted under 35 U.S.C. 154(b) by 179 days.

(21) Appl. No.: 13/756,827

(22) Filed: Feb. 1, 2013

(65) Prior Publication Data

US 2016/0097836 A1  Apr. 7, 2016

Related U.S. Application Data

(60) Provisional application No. 61/633,201, filed on Feb. 7, 2012.

(51) Int. Cl.
*H04W 24/00* (2009.01)
*G01S 5/06* (2006.01)

(52) U.S. Cl.
CPC .......................................... *G01S 5/06* (2013.01)

(58) Field of Classification Search
CPC .......................................................... G01S 5/06
USPC ................ 455/456.1–456.6; 342/357.31, 387
See application file for complete search history.

(56) References Cited

U.S. PATENT DOCUMENTS

| | | | |
|---|---|---|---|
| 8,018,584 B1 | 9/2011 | Amir | |
| 8,139,945 B1 | 3/2012 | Amir et al. | |
| 2007/0178935 A1* | 8/2007 | Shim et al. | 455/552.1 |
| 2008/0186231 A1* | 8/2008 | Aljadeff et al. | 342/387 |
| 2010/0142500 A1* | 6/2010 | Sudak | 370/338 |
| 2010/0148931 A1* | 6/2010 | Pappu et al. | 340/10.2 |
| 2011/0195701 A1* | 8/2011 | Cook et al. | 455/422.1 |
| 2012/0013509 A1* | 1/2012 | Wisherd et al. | 342/451 |
| 2012/0019393 A1* | 1/2012 | Wolinsky et al. | 340/686.1 |
| 2012/0112961 A1* | 5/2012 | Sengupta et al. | 342/357.31 |

* cited by examiner

*Primary Examiner* — Wayne Cai
(74) *Attorney, Agent, or Firm* — Maldjian Law Group LLC

(57) ABSTRACT

Dual-mode position-locating tag, including: a transmitter module configured to communicate with a Wi-Fi network; a transceiver module configured to communicate with a non-Wi-Fi network; a processor coupled to the transmitter module and the transceiver module; and at least one location sensor coupled to the processor, the location sensor coupled to a secondary technology receiver. The transmitter module may transmit a signal to produce a first location measurement. The secondary technology receiver may receive a signal usable to calculate a second location measurement that is more accurate than the first location measurement.

19 Claims, 5 Drawing Sheets

100

SYSTEM AND METHOD FOR MULTIMODE WI-FI BASED RTLS

CROSS-REFERENCE TO RELATED APPLICATIONS

This application claims the benefit of U.S. Provisional Patent Application Ser. No. 61/633,201, filed on Feb. 7, 2012, the entire content of which is hereby incorporated by reference in its entirety.

BACKGROUND

1. Field of the Invention

Embodiments in accordance with the present invention relate to methods and systems for small, portable and battery-operated dual-mode transponders. However, embodiments may be useful in for other problems, e.g., problems in which it is useful to detect the location of, or report sensor measurements from, a monitored mobile object.

2. Description of Related Art

Usage of indoor real time location systems ("RTLS") has gained popularity and is widely used. RTLS is especially popular in the healthcare industry for a variety of applications ranging from tracking of assets and people (e.g., patients and staff), sensing of patient vital signs (e.g., temperature), hygiene compliance, elopement (i.e., unauthorized patient disappearance), theft prevention, and so forth.

Presently known RTLS systems operate based upon one of two main categories of technology: a radio technology and a "secondary" technology. Secondary technology refers to short-range systems that use infrared ("IR"), low-frequency RF ("LF"), ultrasound, or similar technologies, in order to provide localized and highly accurate position determination.

Radio Technology for RTLS systems may be divided into two main groups: (1) Wi-Fi based wireless systems; and (2) non-Wi-Fi based wireless systems. A main difference between these two main groups is that the Wi-Fi based wireless systems allow very quick and low cost entry into RTLS because the Wi-Fi infrastructure (e.g., Wi-Fi Access Points) almost always already has been installed in hospitals and institutions.

In contrast, the non-Wi-Fi based systems require their own communication network to operate. A main advantage of non-Wi-Fi based systems is that they can support more RTLS applications communicating with the network, compared to a Wi-Fi based system. When using a large number of tags, the cost of a non-Wi-Fi based system is substantially lower because the cost of a Wi-Fi based tag is substantially higher. Another fundamental advantage of non-Wi-Fi based system is that the tag size is smaller, and the tag may have a longer battery life because the non-Wi-Fi based system may be designed to be much more energy efficient.

Therefore, there exists a need to provide an improved RTLS system that provides the advantages of both a Wi-Fi system and a non-Wi-Fi system. Such an improved RTLS system may first provide support to an initial Wi-Fi based system, along with an upgrade path to support non-Wi-Fi based systems as demand expands for higher performing solutions and/or increased capacity. An upgrade may later take place, without a need to replace the initial Wi-Fi based system and otherwise making obsolete the initial investment of the Wi-Fi tags and other Wi-Fi infrastructure components. The upgraded system may be able to support different applications in different locations in the facility and optimize cost/performance.

SUMMARY

In one embodiment, an apparatus to determine a location of the apparatus is provided, the apparatus including: a transmitter module configured to communicate with a Wi-Fi network; a transceiver module configured to communicate with a non-Wi-Fi network; a processor coupled to the first transmitter module and the second transceiver module; and at least one location sensor coupled to the processor, the location sensor coupled to a secondary technology receiver. The apparatus may further include at least one non-location sensor coupled to the processor, the non-location sensor configured to produce a measurement that is transmitted through a transceiver module selected by the processor.

In another embodiment, a dual-mode system is provided, including: a dual-mode communication tag having an interface to a first communication network and a second communication network; a secondary technology interface to provide signals used for position determination; a sensor to provide at least one of a patient status and an environmental status; and a system controlled. The system may further include one or more nodes communicatively coupled to one or more dual-mode communication tags.

The preceding is a simplified summary of embodiments of the disclosure to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below.

BRIEF DESCRIPTION OF THE DRAWINGS

The above and still further features and advantages of the present invention will become apparent upon consideration of the following detailed description of embodiments thereof, especially when taken in conjunction with the accompanying drawings wherein like reference numerals in the various figures are utilized to designate like components, and wherein.

Figure 1:
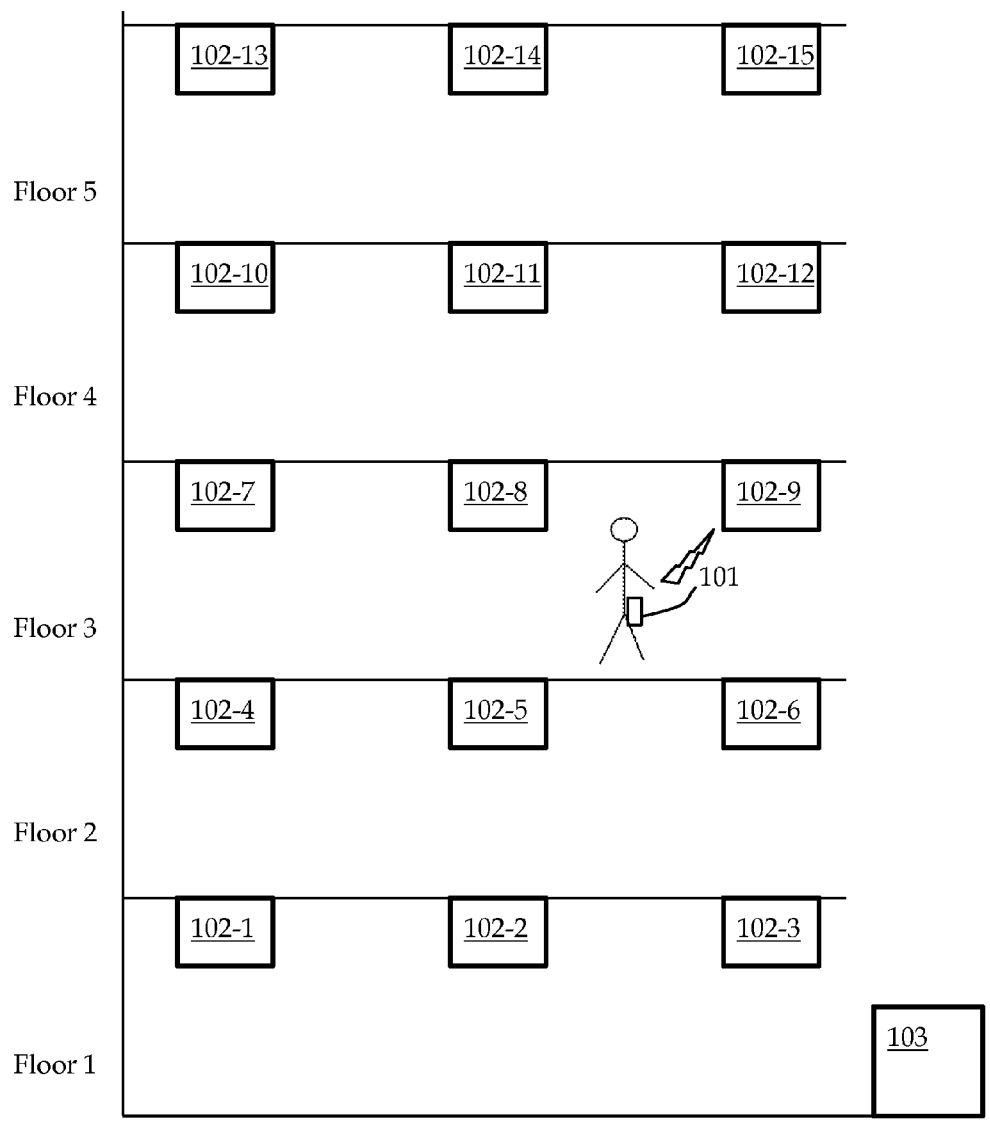
FIG. 1 is a diagram depicting a system in accordance with an embodiment of the present invention.

The headings used herein are for organizational purposes only and are not meant to be used to limit the scope of the description or the claims. As used throughout this application, the word may is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures. Optional portions of the figures may be illustrated using dashed or dotted lines, unless the context of usage indicates otherwise.

DETAILED DESCRIPTION

The disclosure will be illustrated below in conjunction with an exemplary communication system. Although well suited for use with, e.g., a system using a server(s) and/or database(s), the disclosure is not limited to use with any particular type of communication system or configuration of system elements. Those skilled in the art will recognize that the disclosed techniques may be used in any communication application in which it is desirable to utilize location sensors and other sensors (e.g., temperature and humidity) that communicate with a central monitor.

The exemplary systems and methods of this disclosure may also be described in relation to software, modules, and associated hardware. However, to avoid unnecessarily obscuring the present disclosure, the following description omits well-known structures, components and devices that may be shown in block diagram form, are well known, or are otherwise summarized.

In the following detailed description, numerous specific details are set forth in order to provide a thorough understanding of embodiments or other examples described herein. In some instances, well-known methods, procedures, components and circuits have not been described in detail, so as to not obscure the following description. Further, the examples disclosed are for exemplary purposes only and other examples may be employed in lieu of, or in combination with, the examples disclosed. It should also be noted the examples presented herein should not be construed as limiting of the scope of embodiments of the present invention, as other equally effective examples are possible and likely.

As used herein, the term "Real-Time Location System (RTLS)" refers generally to a system that tracks object locations in real time, typically in an indoor environment. The position may be with respect to landmarks of the indoor environment, e.g., particular rooms, floors, building wings, and so forth. An RTLS system provides a function similar to a Global Positioning System ("GPS") for an outdoor environment. An RTLS system may also be used for tracking objects in confined areas outdoors when GPS is deemed too expensive. An exemplary RTLS system is described in U.S. Pat. No. 8,139,945 ("the '945 Patent"), the content of which is hereby incorporated in its entirety.

As used herein, the term "Wi-Fi" refers generally to a bi-directional radio communication technology that operates based on one or more of the 'Institute of Electrical and Electronics Engineers' ("IEEE") 802.11 family of standards, which are incorporated herein by reference. The IEEE 802.11 standards specify the RF and protocol characteristics of a bi-directional radio communication system.

As used herein, the term "non-Wi-Fi" refers generally to a bi-directional radio technology that does not adhere at least to the protocol characteristics of Wi-Fi. A non-Wi-Fi communication system may include a system such as that described in the '945 Patent. A secondary communication network as referred to herein may include a non-Wi-Fi communication system. The secondary communication network may be used to synchronize transportable tags, such as RTLS tags, to a common time standard by use of a transceiver configured to communicate with the non-Wi-Fi communication system. The secondary communication network may include a plurality of access points, such as non-Wi-Fi access points, that are configured to communicate with the transportable tags.

As used herein, the terms "CCX" or "Cisco CCX" refer generally to "Cisco™ Compatible Extensions Program for Wi-Fi Tags." This provides a middleware that allows users of Cisco-compatible network equipment to benefit from extensions developed by third-party developers. Consistency and interoperability are improved by having third-party developers develop extensions that are verified to interoperate with the CCX middleware. Systems from other vendors that are similar to CCX may be referred to herein as "CCX-compatible" systems. CCX-compatible systems generally provide a one-directional communication protocol.

As used herein, the term "RTLS tags" refers generally to typically wireless, battery operated small devices that are designed to work with an RTLS system. RTLS tags may be attached to objects (e.g., people, moveable physical assets, etc.) that need tracking. RTLS tags are typically equipped with a variety of sensors, such as: sensors to monitor vital signs of a patient (e.g., skin temperature, pulse rate, respiration rate, etc.); sensors to monitor environmental factors (e.g., room temperature); sensors to improve power efficiency (e.g., a motion sensor such that processing speeds, sampling rates or the like may be increased during periods of relatively greater motion); sensors to determine localization (e.g., IR and Low Frequency ("LF") sensors, so that communication modes may be adapted to the transmission environment); sensors related to a wireless radio transmitter and/or receiver in order to communicate with access points using either proprietary or standards-based protocols; and so forth. For example, embodiments in accordance with the present invention may incorporate an accelerometer or orientation position sensor into the RTLS tag. Low frequency in the context of the present invention includes electromagnetic emissions located at a center frequency of approximately 125 KHz.

As used herein, the term "infrastructure node" in an RTLS system refers generally to a device that emits an identification ("ID") signal, usually by use of a secondary technology such as IR, LF or ultrasonic signals, which can be received by corresponding receivers in tags, in order to improve localization capabilities. For example, an infrastructure node transmitter may be coupled, for example, to a wheel chair, and be used to help associate a tagged patient to the wheelchair that the tagged patient is sitting in. An infrastructure node transmitter generally operates by periodically transmitting its identity by use of a signal. When a tag on a patient receives the signal from the infrastructure node, the tag will send a transmission to a central monitoring system through access points, in order to indicate that the tag is near the infrastructure node. The tag itself also has an ID, which it also transmits to the central monitoring system.

As used herein, the term "module" refers generally to a logical sequence or association of steps, processes or components. For example, a software module may comprise a set of associated routines or subroutines within a computer program. Alternatively, a module may comprise a substantially self-contained hardware device or circuit device. A module may also comprise a logical set of processes irrespective of any software or hardware implementation.

As used herein, the term "transmitter" may generally comprise any device, circuit, or apparatus capable of transmitting an electrical signal.

As used herein, the term "transceiver" may generally comprise any device, circuit, or apparatus capable of transmitting and receiving an electrical signal.

As used herein, the terms "software-defined radio" or "SDR" refer generally to a radio communication system in which components that have been typically implemented in hardware (e.g. mixers, filters, amplifiers, modulators/demodulators, detectors, etc.) are instead implemented by an appropriately-programmed software-controlled processor directly at RF rates. A high-speed digital-to-analog converter ("DAC") converts the appropriately-processed digital signal to an analog signal for transmission.

The term "computer-readable medium" as used herein refers to any tangible storage and/or transmission medium that participates in storing and/or providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

Embodiments in accordance with the present invention provide a system and method for dual-mode wireless communications involving a small, lightweight and energy-efficient communication tag transceiver. Embodiments also include a plurality of receivers coupled to a central monitoring system, the receivers configured to receive signals from one or more dual-mode communication tags. A dual-mode communication tag in accordance with embodiments of the present invention may also be referred herein as a "dual-mode tag" or simply as a "tag" if it will be clear from the surrounding context that the context refers to a tag of an embodiment of the invention rather than to a tag as known in the background art.

FIG. 1 depicts an example of an illustrative embodiment and operating environment of the present invention. In facility 100, nodes 102-1 through 102-15 may be distributed across a multi-story building. Although nodes 102-1 through 102-15 are illustrated as being uniformly positioned within a floor and among the five illustrated floors, nodes 102-1 through 102-15 may be non-uniformly positioned. A single node, but not necessarily a specific node 102-1 through 102-15, may be referred herein as 102-n or 102-i. In the example, nodes 102-1 through 102-3 are on the lowest floor depicted, while nodes 102-13 through 102-15 are on the highest floor depicted.

Each floor may be considered to be a "zone" within a larger space (i.e., a hospital). However, zones may also refer to something other than floors of the hospital. For example, zones may include but not be limited to, critical patient-care areas, non-patient-care areas, pods, sections of floors, a section of a floor occupied by a single patient, multiple floors, individual rooms, stairwells, elevator car or elevator shaft, and so forth. Zones may also be established by use of virtual wall technology as described in U.S. Pat. No. 8,018,584 ("the '584 Patent"), the content of which is hereby incorporated by reference in its entirety.

A patient within the hospital may carry with him or have affixed to him a dual-mode tag 101. Dual-mode tag 101 may be coupled to the clothing of the person (e.g., hospital gown, shoe heel, etc.) or gear of the person (e.g., wheelchair, brace, cast, crutch, etc.), or an asset such as heart pump, blood pressure measurement equipment or may be coupled to the person himself by being wearable (e.g., wrist band, ankle band, pendant, etc.), or comfortably affixed to the body of the patient (e.g., on a leg with a suitable adhesive). Dual-mode tag 101 transmits and/or receives a signal as packets of data in a well-known fashion. One or more of nodes 102-1 through 102-15 may be able to communicate with dual-mode tag 101 with varying levels of signal quality. Generally, the closest nodes to dual-mode tag 101 and on the same floor as dual-mode tag 101 will experience the best signal quality. In the example depicted in FIG. 1, nodes 102-3, 102-4, 102-5, 102-6, 102-7, 102-8, 102-9, 102-11, and 102-12 may be in communicative contact with dual-mode tag 101 and may be receiving and measuring the signal transmitted by wireless terminal 101. Conversely, one or more of nodes 102-n may be transmitting signals that are received by dual-mode tag 101 and used by dual-mode tag 101 to determine its position. Note that the signal paths of the signal that is transmitted by dual-mode tag 101 may traverse a plurality of zones.

A system controller 103 is in communicative contact with each of nodes 102-1 through 102-15. System controller 103 provides command and timing signals that may be transmitted by each of nodes 102-1 through 102-15, and receives data through nodes 102-1 through 102-15 from each of the monitored dual-mode tags 101 in hospital 100. For example, system controller 103 may be communicatively coupled to at least a portion of nodes 102-1 through 102-15 by a wired connection (e.g., Ethernet, RS-232, RS-485, USB, twisted shielded pair, etc.), or to some nodes 102-n by a wireless connection (e.g., Wi-Fi, Bluetooth®, etc.) if the RF propagation loss is sufficiently low such as may be the case for signal devices 102-n physically located on the same floor as system controller 103.

The dual-mode communication tag is packaged in a small, lightweight form factor that may be affixed to an object, or affixed to a patient comfortably. The tag may include one or more patient sensors and/or environmental sensors. The tag includes communication circuitry used to communicate with a control and monitoring system such as RTLS, a source of power (e.g., a battery), and related support circuitry.

Embodiments in accordance with the present invention may include a dual-mode tag that includes at least two radio frequency ("RF") modules that can communicate with a network. A first RF module may provide a front end that is used to transmit and/or receive a Wi-Fi signal. A second RF module may provide a front end that is used to transmit and/or receive a non-Wi-Fi signal. The RF modules may also be referred to herein as transceivers even if not both the transmit and receive functions are used.

Figure 2:
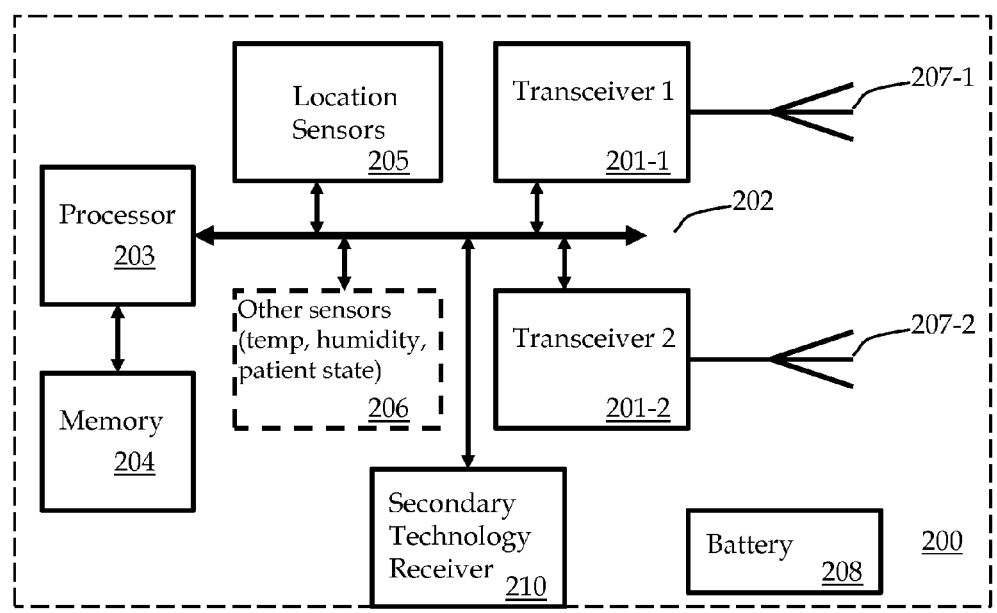
FIG. 2 is a diagram depicting at a high level of abstraction a dual-mode tag in accordance with an embodiment of the present invention.

FIG. 2 illustrates at a high level of abstraction a block diagram of a dual-mode tag 200 in accordance with an embodiment of the present invention. Tag 200 includes a first transmitter 201-1, which may function as, e.g., a Wi-Fi communication interface, and a second transceiver 201-2, which may function as, e.g., a non-Wi-Fi communication interface. Transceivers 201-1 and 201-2 may be communicatively coupled via data bus 202 with processor 203. Processor 203 is communicatively coupled with memory 204. Memory 204 may be configured to store data, configuration settings, and the like, and to store instructions that, when performed by processor 203, cause tag 200 to perform functions described herein. Tag 200 may further include one or more of location sensors 205 and/or environmental sensors 206. Location sensors 205 may utilize secondary technology and associated secondary technology receiver 210 as described herein, for the purpose of position determination. Environmental sensors 206 may include sensors related to patient vital signs, patient state, the environment in the vicinity of the patient, and so forth. Sensors 205, 206 may be communicatively coupled via data bus 202 with processor 203. Transceivers 201-1 and 201-2 are coupled to a respective antenna 207-1 and 207-2 for transmission and/or reception of RF signals. In some embodiments, a single antenna may be used in lieu of separate antenna 207-1 and 207-2. A battery 208 is used to provide electrical power to components of tag 200. Persons of skill in the art will realize that the high-level depiction of FIG. 2 omits certain known features such as internal circuitry, battery charging interface, and so forth.

The dual-mode tag 200 will include at least a first set of transmit and receive antennas. A single antenna with an appropriate RF circuitry or similar device may provide both the transmit interface and receive interface if the frequency response of the antenna is sufficiently broad to cover the relevant frequencies. In some embodiments, if the non-Wi-Fi operative mode uses an RF frequency range within the frequency response of the antenna, a single antenna may also be used for the non-Wi-Fi RF signal interface. In other embodiments, a separate antenna may be provided for the non-Wi-Fi interface so that the separate antennas may be designed to better match characteristics of the Wi-Fi RF link and the non-Wi-Fi RF link.

Embodiments in accordance with the present invention may operate by default in a Wi-Fi operating mode since Wi-Fi technology is prevalently deployed. In the Wi-Fi operating mode, the dual-mode tag will communicate with one or more receivers coupled to a central monitoring system by use of Wi-Fi signals, while periodically searching for a non-Wi-Fi wireless support infrastructure or system. In some embodiments, the presence of a non-Wi-Fi system is indicated by receiving a response from a non-Wi-Fi network to a "paging" (i.e., discovery) signals from the dual-mode tag. Typically the dual-mode tag will communicate to only one network at one time. The dual-mode tag can have at least four modes of operation:

In a first operating mode, and in the absence of detection of a non-Wi-Fi system or wireless infrastructure, embodiments of the dual-mode tag may operate only using Wi-Fi signals. In some embodiments, the communication is one-directional from the dual-mode tag to access points. In some embodiments, the dual-mode tag uses the Cisco CCX protocol.

In the first operating mode, the tags and the Wi-Fi infrastructure components are relatively un-synchronized with each other. Spatial resolution performance and tag battery life both may be poor because the tag uses Wi-Fi signals, which uses high power, while the dual-mode tag also scans the infrared, ultrasound, and/or LF environment to detect predetermined transmissions from infrastructure nodes. Infrastructure nodes may also be referred to herein as Exciters. Exciters may transmit a signal using technology such as infrared ("IR"), ultrasound ("US"), or low-frequency RF ("LF")

In a second operating mode, embodiments of the dual-mode tag may operate as a non-Wi-Fi tag that communicates with the central monitoring system by use of a non-Wi-Fi communication system.

In the second operating mode, the non-Wi-Fi communication system may include a system such as that described in the '945 Patent. The non-Wi-Fi communication system may operate in the 900 MHz communication band, and provide an infrastructure and support network in order to communicate with dual-mode tags and nodes. In the second operating mode, the dual-mode tag can use very efficiently the 900 MHz band for transmission, as well as synchronize timing and communication with the use of signals transmitted by Exciters. Synchronized timing reduces positional uncertainty, provides high spatial resolution performance, and provides lower power consumption by the dual-mode tags, resulting in longer tag battery life.

Synchronized timing of transmitters and receivers in the dual-mode tag with that of their corresponding receivers and transmitters in the supporting infrastructure lowers power consumption by enabling the dual-mode tag to enter a lower state of power consumption when no communication signals are expected to be sent or received. The lower state of power consumption may be managed by a power management module in a processor of the dual-mode tag. In particular, the transmitters and receivers in the dual-mode tag may be powered down individually or together when no signal needs to be sent and/or no signal is expected to be received, and the processor itself may enter a state of lower power consumption if less processing power is needed by the transmitter and/or receiver.

In addition, a faster tag update rate may be possible, since the second operating mode enables more precise timing knowledge. Tag updates may include reporting of tag sensor measurements (including position determination) to a central monitoring system, and receipt of data or instructions from the central monitoring system. Tag update rate may be adjusted by a processor module (e.g., an update rate module) in coordination with the central monitoring system and with the exchange of configuration messages.

In a third operating mode, the 900 MHz infrastructure may be used only to synchronize timing to the infrastructure, for instance by adjusting a time clock of the dual-mode tag based upon timing information derived from the non-Wi-Fi signal. The third operating mode provides the best spatial resolution performance but with poor power consumption. This type of system may be required by operation or policy constraints at a facility where embodiments in accordance with the present invention may be operating. Once such constraint may be a facility requirement that all location-tracking systems use a Wi-Fi network to derive location.

In a fourth operating mode, the dual-mode tags may use synchronization, but the infrastructure will not use synchronization. The fourth operating mode provides good power consumption for tags but without the superior spatial resolution.

Control of operating modes, including transition between various modes, may be controlled by an appropriately-programmed processor in the dual-mode tag. The processor may be coupled to a memory that stores program instructions, operating parameters for the dual-mode tag, measurements received from sensors coupled to the processor, data received from or transmitted by the first and/or second RF modules, and so forth.

Figure 3:
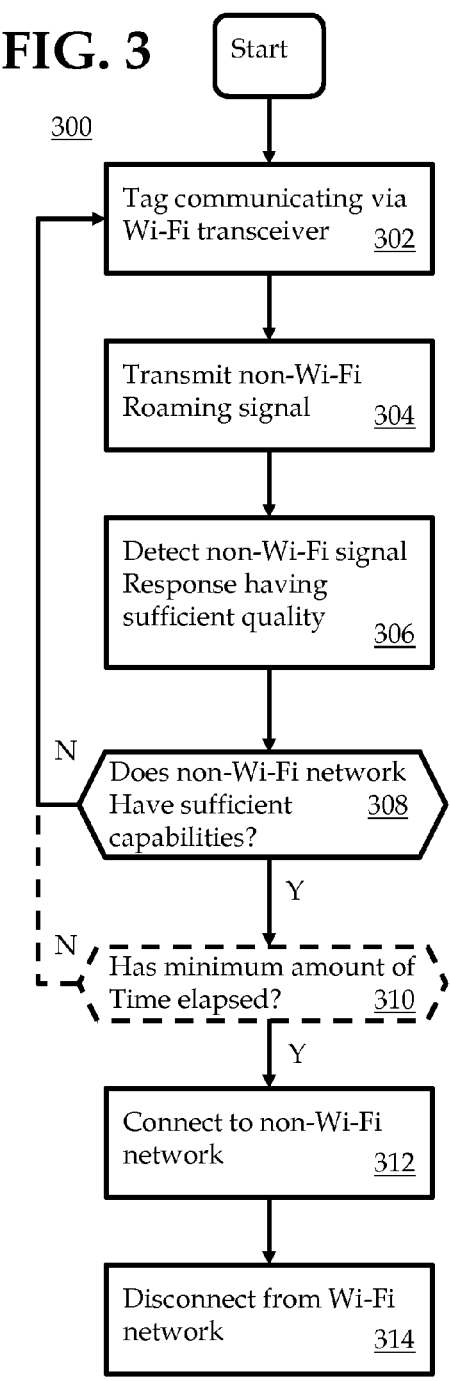
FIG. 3 is a diagram depicting at a high level of abstraction a method for controlling a dual-mode tag in accordance with an embodiment of the present invention.

Switching from the first operating mode to the second operating mode may take place when the dual-mode tag is operating in the first operating mode and detects the presence of a communication interface corresponding to the second operating mode. For example, if the dual-mode tag is operating in the first operating mode and detects the presence of non-Wi-Fi support infrastructure, the dual-mode tag may follow one of at least two options, depending on the requirements and the type of support network that exists:

FIG. 3 illustrates a method 300 that implements an embodiment when operating in the first operating mode, such that the dual-mode tag may continue operating with the Wi-Fi network unless the non-Wi-Fi network has sufficient capabilities.

Method 300 begins at step 302, at which the tag is communicating with a support network and infrastructure via Wi-Fi signals.

Next, at step 304, the dual-mode tag may transmit a non-Wi-Fi roaming signal in order to stimulate a response from any infrastructure nodes that may receive the roaming signal. It will be understood that the roaming signal may be transmitted concurrently with the communication of step 302.

Next, at step 306, the dual-mode tag may detect the presence of non-Wi-Fi signals of sufficient quality. Sufficient quality may include a quality of the non-Wi-Fi signal that is above a threshold, or a quality of the non-Wi-Fi signal that is above the Wi-Fi signal quality by a sufficient amount. Quality may be measured by signal strength, signal-to-noise ratio, etc.

Next, at step 308, the non-Wi-Fi system may be queried to determine whether it offers sufficient capabilities. If the result of step 308 is negative, control of method 300 passes back to step 302, at which the dual-mode tag continues to send location and other monitored sensory information (e.g., patient vital signs or environmental data) using the Wi-Fi network. If the result of step 308 is positive, control of method 300 continues to step 310.

Next, at optional step 310, in some embodiments the dual-mode tag may wait for a waiting time before connecting to the non-Wi-Fi network. The waiting time implements a hysteresis in the switching process such that a tag will be switched from a first operating mode to a second operating mode if the signal quality of the second operating mode is sufficiently high for at least a pre-determined amount of time. The waiting time helps prevent bouncing between modes if the signal quality is fluctuating at about the sufficient level of quality. If insufficient time has passed, or if the non-Wi-Fi signal quality drops below the sufficient level of quality, control of method 300 passes to step 302. However, if sufficient time at a sufficient quality has passed, control of method 300 passes to step 312.

At step 312, the dual-mode tag connects to and begins communicating with the non-Wi-Fi network, and at step 314 the dual-mode tag may discontinue communicating with the Wi-Fi network.

Concurrently with method 300, the dual-mode tag may be receiving signals from infrastructure nodes via the secondary technology (e.g., IR, LF, ultrasound, etc.). Persons of skill in the art will recognize that certain steps of method 300 may be performed concurrently or in a different order than depicted in FIG. 3.

Conversely, if the dual-mode tag is operating in the second operating mode and detects the presence of Wi-Fi support infrastructure, the dual-mode tag may follow one of at least two options, depending on the requirements and the type of support network that exists:

In a first option when operating in the second operating mode, the dual-mode tag may continue to send location and other monitored sensory information using the non-Wi-Fi network if certain predetermined criteria are met. This situation may occur if, for example, a signal quality of the non-Wi-Fi network is better than a signal quality of the Wi-Fi network, or if the signal quality of the non-Wi-Fi network continues to exceed a predetermined threshold level of quality, or if a delay or hysteresis is incorporated into the switching process such that a system will be switched from a second operating mode to a first operating mode if the signal quality of the first operating mode is better than the signal quality of the second operating mode for at least a pre-determined amount of time.

Because the second operating mode, when available, is favored over the first operating mode, the delay or hysteresis need not be symmetric when switching from the second operating mode to the first operating mode, compared to switching from the first operating mode to the second operating mode. For example, the delay or hysteresis when switching from the second operating mode to the first operating mode may be relatively longer.

In a second option when operating in the second operating mode, the dual-mode tag may disconnect from the non-Wi-Fi network and use the Wi-Fi network for sending location and other sensory information. The dual-mode tag may communicate with the Wi-Fi system in order to provide the necessary information or signaling to facilitate the features that the Wi-Fi network can provide, or suspend or disable features provided by the non-Wi-Fi network but not provided by the Wi-Fi network.

Figure 4:
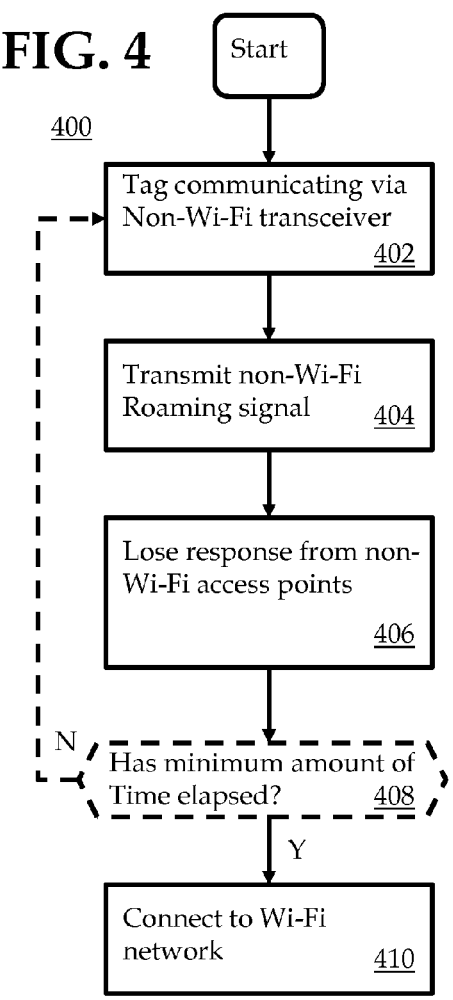
FIG. 4 is a diagram depicting at a high level of abstraction a method for controlling a dual-mode tag in accordance with another embodiment of the present invention.

The second option is illustrated as method 400 in FIG. 4. Method 400 begins at step 402, at which the dual-mode tag is communicating via the non-Wi-Fi transceiver. Substantially concurrently, the non-Wi-Fi tag may continue transmitting a roaming signal as indicated by step 404.

Next, at step 406, the dual-mode tag may lose a response from the non-Wi-Fi access point.

Next, at optional step 408, some embodiments may include a delay or hysteresis before switching from the second operating mode to the first operating mode, for the reasons described above. If sufficient time has not elapsed, control of method 400 may pass to step 402, at which the dual-mode tag may continue to transmit using the second operating mode. If sufficient time has elapsed, then control of method 400 would pass to step 410.

Finally, at step 410, method 400 concludes by the dual-mode tag connecting to the Wi-Fi network.

The second option may also be used if a dual-mode tag is operating in the second operating mode, but the dual-mode tag does not detect a secondary technology emission (e.g., IR, low frequency ("LF") exciter, or ultrasound). In this situation the dual-mode tag may transition to the first operating mode (i.e., Wi-Fi only), because defining a location of the dual-mode tag based on Wi-Fi signals may be more accurate in some circumstances. Wi-Fi technology will likely cover an entire facility, whereas non-Wi-Fi technology (e.g., 900 MHz) may likely cover only a portion of the facility, such as a floor or a portion of a floor. Position measurement using non-Wi-Fi signals may use a triangulation technique. However, triangulation is less accurate when the triangulated position is relatively far removed from the transmitting sources used for triangulation. Therefore, when attempting to determine tag location in a portion of the facility that is not within non-Wi-Fi transmitting coverage area used for triangulation, Wi-Fi signals may be used for position determination. So, using Wi-Fi when the dual-mode tag does not receive the secondary technology signal will result in better performance. For example, suppose a user is using the second operating mode, and is located on a floor above or below a 900 MHz section. The user may be incorrectly deemed to be located on the floor with the 900 MHz section, effectively being "sucked" into the 900 MHz section. On the other hand, if the user is using Wi-Fi location determination techniques, the user should be easily identified as being on the correct floor.

Embodiments in accordance with the present invention may provide mesh network connectivity, at least for timing information, between dual-mode tags operating in the second operating mode.

Embodiments in accordance with the present invention may provide storage of tag setup parameters on one or more 900 MHz "stars" (i.e., access points of the non-Wi-Fi network). When a dual-mode tag pages the star, the star responds with the needed tag setup. For example, in a network that does not have infrastructure nodes such as IR Monitors or LF exciters, the dual-mode tags do not need to look for infrastructure nodes and may thus substantially save power. When the same tags enter another facility that supports specific secondary technology, the tags set their profile up to accommodate for the new network operating environment.

Other elements of the RTLS network include an infrastructure node and a Monitor. As with the dual-mode tag, the other elements of the RTLS network are typically battery operated and may support both Wi-Fi and non-Wi-Fi modes of operation. For example, battery operated infrastructure nodes may be equipped with a dual-mode communication front end in order to allow access to an expanded feature set when operating with a non-Wi-Fi support infrastructure.

The expanded feature set may include power management features as described herein, implementation of a provisionable tag update rate, control over allowable operating modes or transitions between modes, and so forth.

In many Wi-Fi based RTLS installations, a system utilizes a variation of Wi-Fi that provides only one-directional communication (from tag to system). Example systems include the Cisco™ CCX tag protocol and similar systems from other network providers such as Motorola™ and Aruba™. These and similar systems will be referred to herein as CCX-compatible systems. Because the CCX protocol is one-directional, it cannot be used to communicate back to the tag for setup information, software upgrades and tag control. In these cases the non-Wi-Fi radio technology that can be made two-directional, so that the non-Wi-Fi radio technology can be used to support communication back to the tag. In one embodiment of the current invention a mobile controller can be used to communicate with the Wi-Fi system components (that are only allowed to access the network with the CCX or other one directional protocols) in order to set them up, upgrade them or command them. The mobile controller allows the user temporarily connect with the tag and communicate back to the tag setup parameters or upgrade its software. Once it leaves the area of coverage the tag falls back to Wi-Fi operation with the new parameters or upgraded software.

In an embodiment in accordance with the present invention as illustrated in FIG. 2, a dual-mode tag may include a single processing unit 203 that can switchably transmit and/or receive a data signal through either a Wi-Fi RF transceiver 201-1, or a non-Wi-Fi (i.e., secondary radio) RF transceiver 201-2. Connectivity between internal sensors 205, 206, processor 203, and communication components 201-1, 201-2 of the tag may be implemented by an internal data bus 202. The transceivers 201-1 and 201-2, and the sensors 205 and 206, can be independently and directly controlled by the processor via internal data bus 202.

Figure 5:
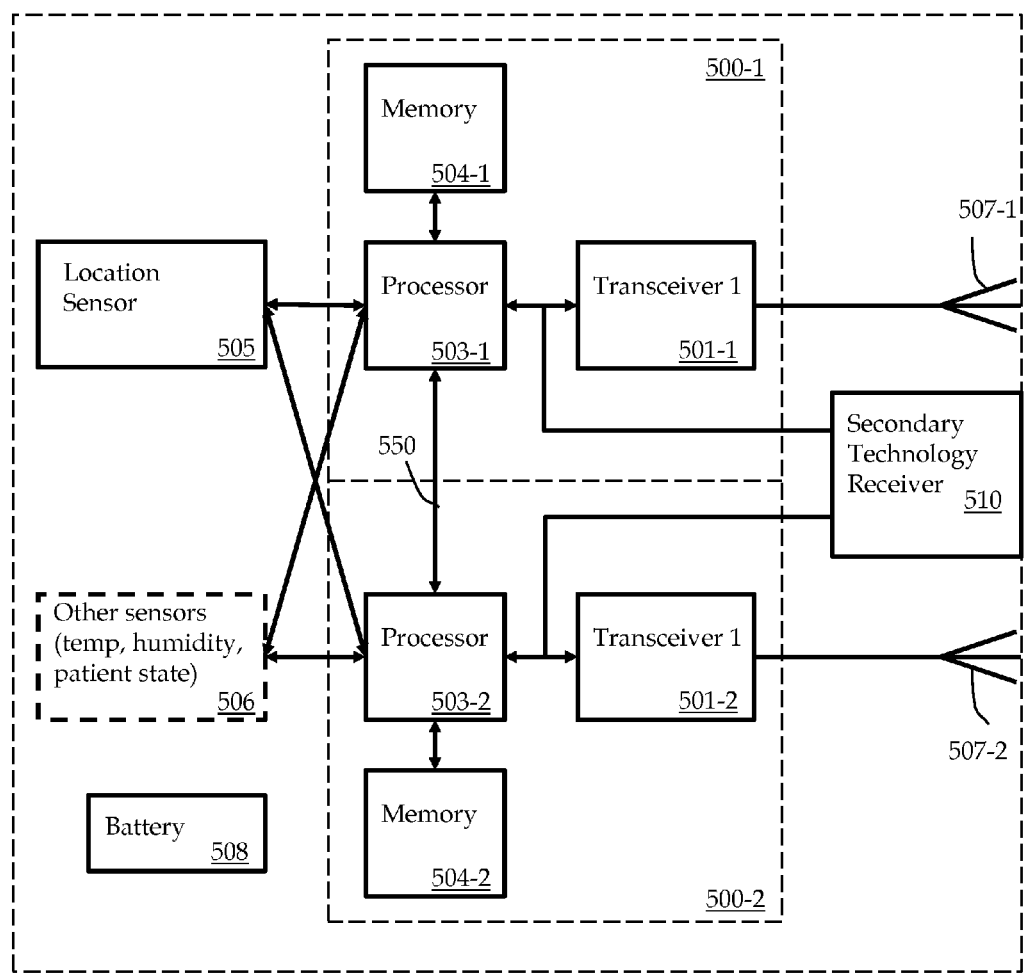
FIG. 5 is a diagram depicting at a high level of abstraction a dual-mode tag in accordance with another embodiment of the present invention.

In another embodiment of the current invention as illustrated in FIG. 5, the dual-mode tag 500 includes two substantially independent modules 500-1 and 500-2. A first module 500-1 may be dedicated to the Wi-Fi technology and a second module 500-2 may be dedicated to the non-Wi-Fi technology. The two modules may communicate with each other through a simple serial link 550, a bus, or a link using another protocol. One module (e.g., 500-1) may be configured as a Master and the other module (e.g., 500-2) may be configured as a Slave. The Master module may take control from the Slave module, or may give control to the Slave module.

Dual-mode tag 500 includes location sensors 505 that may utilize secondary technology and associated secondary technology receiver 510 as described herein, for the purpose of position determination. Other sensors 506 are optional and may include sensors related to patient vital signs, patient state, the environment in the vicinity of the patient, and so forth. Substantially all sensors 505, 506 (e.g., motion sensor, infrared ("IR") receiver/ transmitter, ultrasound ("US") transmitter/ receiver, environment, vital signs, etc.) are connected to one or both of the modules.

Figure 6:
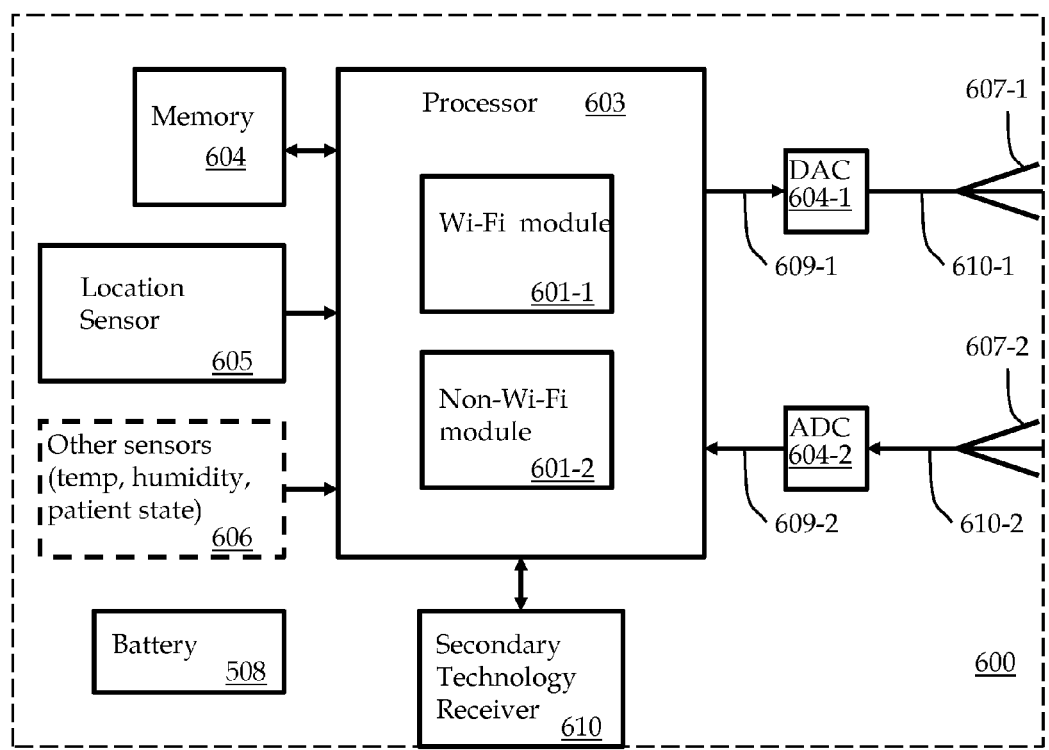
FIG. 6 is a diagram depicting at a high level of abstraction a dual-mode tag in accordance with another embodiment of the present invention.

In another embodiment in accordance with the present invention as illustrated in FIG. 6, dual-mode tag 600 may be implemented by an appropriately-programmed Software Defined Radio ("SDR"). The SDR implementation may provide a compact and cost effective solution. Tag 600 includes a processor 603. Processor 603 in turn includes Wi-Fi module 601-1 and non-Wi-Fi module 601-2. Dual-mode tag 600 includes location sensors 605 that may utilize secondary technology and associated secondary technology receiver 610 as described herein, for the purpose of position determination. Other sensors 606 are optional and may include sensors related to patient vital signs, patient state, the environment in the vicinity of the patient, and so forth. Memory 604 and sensors 605, 606 are coupled to processor 603.

When transmitting a signal, processor 603 will select and internal operating mode of Wi-Fi or non-Wi-Fi using criteria described earlier with respect to other embodiments of the dual-mode tag. Processor 603 will produce a digital signal at line 609, which is then provided on line 609-1 to digital-to-analog converter ("DAC") 604. DAC 604 produces an analog RF signal which is then transmitted on line 610 to antenna 607-1 for transmission to network nodes (not illustrated in FIG. 6).

When receiving a signal, processor 603 will select and internal operating mode of Wi-Fi or non-Wi-Fi using criteria described earlier with respect to other embodiments of the dual-mode tag. An RF signal from one or more nodes (not illustrated) will be received at antenna 607-2 and will be passed on line 610-2 to analog-to-digital converter ("ADC") 604-2. ADC 604-2 produces a digital signal, which is passed on line 609-2 to processor 603. Module 601-1 will process a received Wi-Fi signal, and module 601-2 will process a received non-Wi-Fi signal.

Antennas 607-1 and 607-2 may be combined into a single transmit/receive antenna by use of techniques known in the art of antenna design. Furthermore, although antennas 607-1 and 607-2 are illustrated as respectively transmitting and receiving both Wi-Fi and non-Wi-Fi signals, separate antennas may be provided for Wi-Fi and non-Wi-Fi signals.

Examples of Support Infrastructure

The Wi-Fi protocol, while very widespread and powerful for general usage, is not optimized for RTLS. Battery life requirements for an RTLS system, driven in part by related requirements for size, weight, patient comfort, and so forth, impose stringent power consumption requirements. Conventional Wi-Fi systems use a wide bandwidth to provide hundreds of megabits per second connectivity over a relatively long range, which then requires large peak transmitted power and is much less efficient than radio systems that are dedicated to RTLS and other applications. In contrast, RTLS systems are relatively lower data rate and do not need a wide bandwidth. Peak transmitted power is reduced because the data rate and bandwidth are lower.

Furthermore, the CCX Wi-Fi protocol is not suitable for applications in which two-directional communication is needed, such as if components synchronization is needed to facilitate applications such as usage of virtual wall technology as described in the '584 Patent, or bleeding control. Such applications require a network that will support sub uS (micro-second) synchronization.

In some situations, a large facility (e.g., hospital or other institution) may have differing needs for features, depending upon location within the facility. For example within a hospital, critical care areas such as an emergency room ("ER"), an operating room ("OR"), a post-anesthesia care unit ("PACU"), etc., may require high position localization accuracy in open areas. In these locations, the hospital may install a support infrastructure (e.g., a non-Wi-Fi network) in places where high localization accuracy is needed, or may install additional nodes to an existing non-Wi-Fi network. Another example may be the use of RTLS for a nurse call system, in which bleeding control is required, such that additional support infrastructure may be installed to support bleeding control.

In contrast, non-patient-care areas (e.g., cafeteria, visitor waiting rooms, pharmacy, etc.) ordinarily have little need for more precise support infrastructure. Simpler and more cost-effective methods such as triangulation or other low accuracy methods can be used, thus reducing costs.

It is important to note that the foregoing are only examples of the value of a dual-mode support system/infrastructure. Such dual-mode systems provide communication services within a first frequency transmission band and a first related support network that are designed to be optimized for a first purpose, while also providing communication services within a second frequency transmission band and a second related support network that are designed to use a conventional industry standard-type of network.

Mobile Controller

In some locations where Wi-Fi is installed, only CCX-compatible Wi-Fi may be allowed, i.e., no IP address has been assigned to dual-mode tags. At such locations, embodiments in accordance with the present invention may include a wireless mobile controller that communicates using non-Wi-Fi technology in order to provide bidirectional communications between a control system and nodes. For example, the mobile controller may be used to support device setup of nodes such as dual-mode tags. When the mobile controller is used, nodes will detect the mobile controller, will initiate communication with the mobile controller, and will accept commands and profiles (i.e., modes of operation) from the mobile controller. Examples of modes of operation may include control of an exciter transmitted power, or transmission rate of a dual-mode tag or an infrastructure node.

The disclosed methods may be readily implemented in software, such as by using object or object-oriented software development environments that provide portable source code that can be used on a variety of computer or workstation platforms. Alternatively, the disclosed system may be implemented partially or fully in hardware, such as by using standard logic circuits or VLSI design. Whether software or hardware may be used to implement the systems in accordance with various embodiments of the present invention may be dependent on various considerations, such as the speed or efficiency requirements of the system, the particular function, and the particular software or hardware systems being utilized.

While the foregoing is directed to embodiments of the present invention, other and further embodiments of the present invention may be devised without departing from the basic scope thereof. It is understood that various embodiments described herein may be utilized in combination with any other embodiment described, without departing from the scope contained herein. Further, the foregoing description is not intended to be exhaustive or to limit the invention to the precise form disclosed. Modifications and variations are possible in light of the above teachings or may be acquired from practice of the invention. Certain exemplary embodiments may be identified by use of an open-ended list that includes wording to indicate that the list items are representative of the embodiments and that the list is not intended to represent a closed list exclusive of further embodiments. Such wording may include "e.g.," "etc.," "such as," "for example," "and so forth," "and the like," etc., and other wording as will be apparent from the surrounding context.

No element, act, or instruction used in the description of the present application should be construed as critical or essential to the invention unless explicitly described as such. Also, as used herein, the article "a" is intended to include one or more items. Where only one item is intended, the term one or similar language is used. Further, the terms any of followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items.

Moreover, the claims should not be read as limited to the described order or elements unless stated to that effect. In addition, use of the term "means" in any claim is intended to invoke 35 U.S.C. §112, ¶ 6, and any claim without the word "means" is not so intended.

What is claimed is:

1. A dual-mode position-locating tag, comprising:
   a transmitter module to communicate via a Wi-Fi signal with a Wi-Fi network through a fixed-location Wi-Fi base station, wherein the Wi-Fi signal comprises information usable to produce a first location measurement;
   a transceiver module to communicate with a non-Wi-Fi network;
   a processor coupled to the transmitter module and the transceiver module; and
   at least one location sensor coupled to the processor, the location sensor coupled to a secondary technology receiver, wherein the secondary technology receiver receives a signal that is usable to produce a second location measurement,
   wherein the processor synchronizes a time clock of the dual-mode position-locating tag to the non-Wi-Fi network by use of synchronization signals received by the non-Wi-Fi transceiver.

2. The dual-mode position-locating tag of claim 1, wherein the processor further comprises:
   a first processor module communicatively coupled to the transmitter module;
   a second processor module communicatively coupled to the transceiver module;
   a location-determination module, wherein the location-determination module produces the second location measurement, wherein the second location measurement is more accurate than the first location measurement.

3. The dual-mode position-locating tag of claim 1, wherein the processor synchronizes the dual-mode position-locating tag to a secondary communication network by use of a signal received by the secondary technology receiver.

4. The dual-mode position-locating tag of claim 3, wherein the secondary communication network comprises synchronized non-Wi-Fi access points.

5. The dual-mode position-locating tag of claim 3, wherein the processor senses for the signal received by the secondary technology receiver.

6. The dual-mode position-locating tag of claim 5, wherein the dual-mode position-locating tag communicates only by use of the transceiver module when the signal received by the transceiver module meets a predetermined criterion.

7. The dual-mode position-locating tag of claim 1, wherein the signal received by the secondary technology receiver is produced by a network comprising a plurality of ultrasonic exciters.

8. The dual-mode position-locating tag of claim 1, wherein the signal received by the secondary technology receiver is produced by a network comprising a plurality of infrared exciters.

9. The dual-mode position-locating tag of claim 1, wherein the signal received by the secondary technology receiver is produced by a network comprising a plurality of low-frequency radio exciters.

10. The dual-mode position-locating tag of claim 1, wherein the processor further comprises a power management module to reduce power consumption of the dual-mode position-locating tag when there is no radio signal to transmit or expected to receive.

11. The dual-mode position-locating tag of claim 1, wherein the processor further comprises an update rate module adjusts an update rate of the dual-mode position-locating tag.

12. The dual-mode position-locating tag of claim 1, further comprising an environmental sensor coupled to the processor, the environmental sensor to produce a measurement that is transmitted through a transceiver module selected by the processor.

13. The dual-mode position-locating tag of claim 1, wherein the Wi-Fi signal comprises a signal, transmitted by the transmitter module, that is compatible with a CCX protocol.

14. The dual-mode position-locating tag of claim 1, wherein:
the transmitter module comprises a first radio frequency (RF) module;
the transceiver module comprises a second RF module; and
the first RF module is different than the second RF module.

15. The dual-mode position-locating tag of claim 14, wherein one of the first RF module and the second RF module comprises a master module, and one of the first RF module and the second RF module comprises a slave module.

16. The dual-mode position-locating tag of claim 1, wherein timing of the dual-mode position-locating tag is provided by use of a signal received by one selected from the group consisting of the secondary technology receiver and the transceiver module.

17. The dual-mode position-locating tag of claim 1, wherein the dual-mode position-locating tag provides a location accuracy that is dependent upon a location of the dual-mode position-locating tag.

18. The dual-mode position-locating tag of claim 1, wherein the first location measurement and the second location measurement comprise indoor location measurements.

19. A dual-mode system controller, comprising:
a receiver module to receive a signal from a dual-mode tag that is enabled for Wi-Fi communication to track a location of the dual-mode tag;
a transceiver module to communicate with the dual-mode tag by use of a non-Wi-Fi communication signal from a non-Wi-Fi network, wherein the transceiver module communicates operational parameters to the dual-mode tag, wherein the non-Wi-Fi communication signal comprises a synchronization signal to synchronize a time clock of the dual-mode tag to the non-Wi-Fi network; and
a processor coupled to the receiver module and the transceiver module.

* * * * *